US008164514B1

(12) United States Patent
Yang et al.

(10) Patent No.: US 8,164,514 B1
(45) Date of Patent: Apr. 24, 2012

(54) METHOD AND APPARATUS FOR FUSING REFERENCED AND SELF-CONTAINED DISPLACEMENT MEASUREMENTS FOR POSITIONING AND NAVIGATION

(76) Inventors: Chun Yang, San Mateo, CA (US); Andrey Soloviev, Fort Walton Beach, FL (US)

( * ) Notice: Subject to any disclaimer, the term of this patent is extended or adjusted under 35 U.S.C. 154(b) by 0 days.

(21) Appl. No.: 13/037,603

(22) Filed: Mar. 1, 2011

Related U.S. Application Data

(63) Continuation-in-part of application No. 12/436,868, filed on May 7, 2009, now Pat. No. 8,063,825.

(51) Int. Cl.
*G01S 19/45* (2010.01)
(52) U.S. Cl. .................................. 342/357.28
(58) Field of Classification Search ............. 342/357.28
See application file for complete search history.

(56) References Cited

U.S. PATENT DOCUMENTS

| | | | |
|---|---|---|---|
| 3,747,106 A | 7/1973 | Dalabakis et al. | |
| 5,890,090 A * | 3/1999 | Nelson, Jr. | 701/213 |
| 6,240,367 B1 * | 5/2001 | Lin | 701/214 |
| 6,861,984 B2 | 3/2005 | Rabinowitz et al. | |
| 7,498,873 B2 | 3/2009 | Opshaug et al. | |
| 2002/0101912 A1 * | 8/2002 | Phelts et al. | 375/148 |
| 2005/0197769 A1 * | 9/2005 | Soehren et al. | 701/220 |
| 2010/0265130 A1 * | 10/2010 | Mao | 342/357.28 |
| 2010/0287038 A1 * | 11/2010 | Copejans | 705/13 |
| 2011/0102255 A1 * | 5/2011 | Scherzinger | 342/357.28 |

OTHER PUBLICATIONS

Soloviev, Andrey "Driven Downtown", GPS World, Oct. 1, 2008.*
Graas et al., "High-Accuracy Differential Positioning for Satellite-Based Systems Without Using Code-Phase Measurement", Navigation,Winter 1995,pp. 605-618, vol. 42,No. 4, US.
Farrell, "Between the Lines: A Fortuitous Meeting", GPS World, Sep. 24, 2010, United States.
Yang et al., "Symmetric Phase-Only Matched Filter (SPOMF) for Frequency-Domain Software GPS Receivers", Navigation, Spring 2007, pp. 31-42, vol. 54, No. 1, US.
Soloviev et al., "Navigation in Difficult Evironments: Multi-Sensor Fusion Techniques", Nato/Otan RTO-EN-SET-116, 2010, pp. 9-1 to 9-28, United States.
Soloviev, "Tight Coupling of GPS, INS, and Laser for Urban Navigation", IEEE Transactions on Aerospace and Electronic Systems, Oct. 2010, pp. 1731-1746, vol. 46, No. 4, US.

* cited by examiner

*Primary Examiner* — Thomas Tarcza
*Assistant Examiner* — Frank J. McGue
(74) *Attorney, Agent, or Firm* — LaMorte & Associates, P.C.

(57) ABSTRACT

A system and associated methods for mutual-aiding and mutual-calibrating positioning and navigation that fuse self-contained and referenced displacement measurements to provide position, velocity, and attitude estimates. In one embodiment the system includes a dead-reckoning device, a radio signal receiver, and a computational device that performs integration with mutual aiding and mutual calibration, leading to a position, velocity, and attitude solution. In another embodiment the system further includes auxiliary sensors. In one embodiment the method that performs fusion of dead-reckoning and radio signal measurements includes dead-reckoning mechanization, estimation of radio signal parameters including signal strength, code phase, and carrier phase, coarse initialization of navigation states with code phase and signal strength measurements, refinement of navigation estimation using temporal carrier phase differences, and estimation of dead-reckoning and radio measurement error terms. In another embodiment the method also includes identification and estimation of non-line-of-sight multipath signals for mitigation and removal.

19 Claims, 5 Drawing Sheets

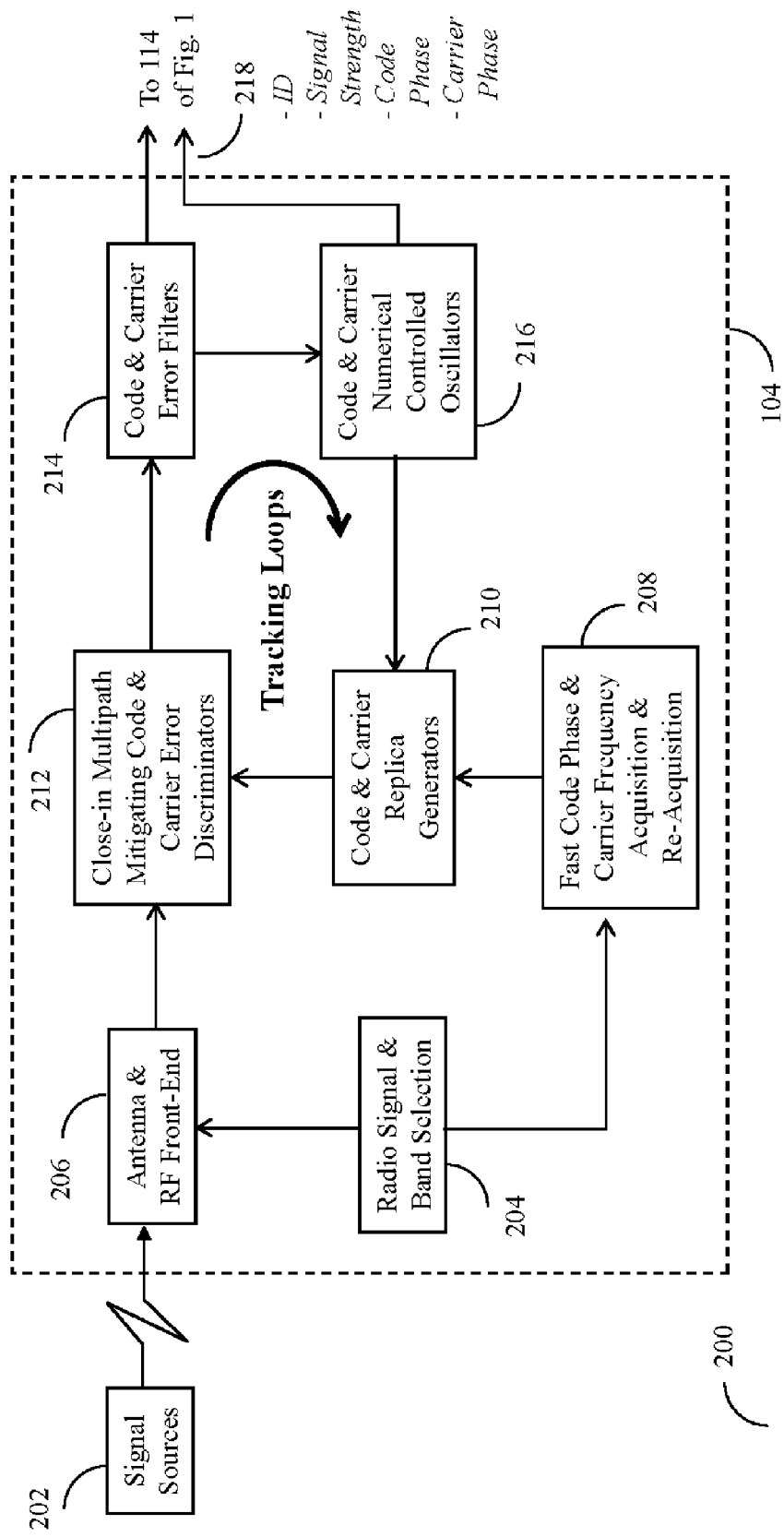

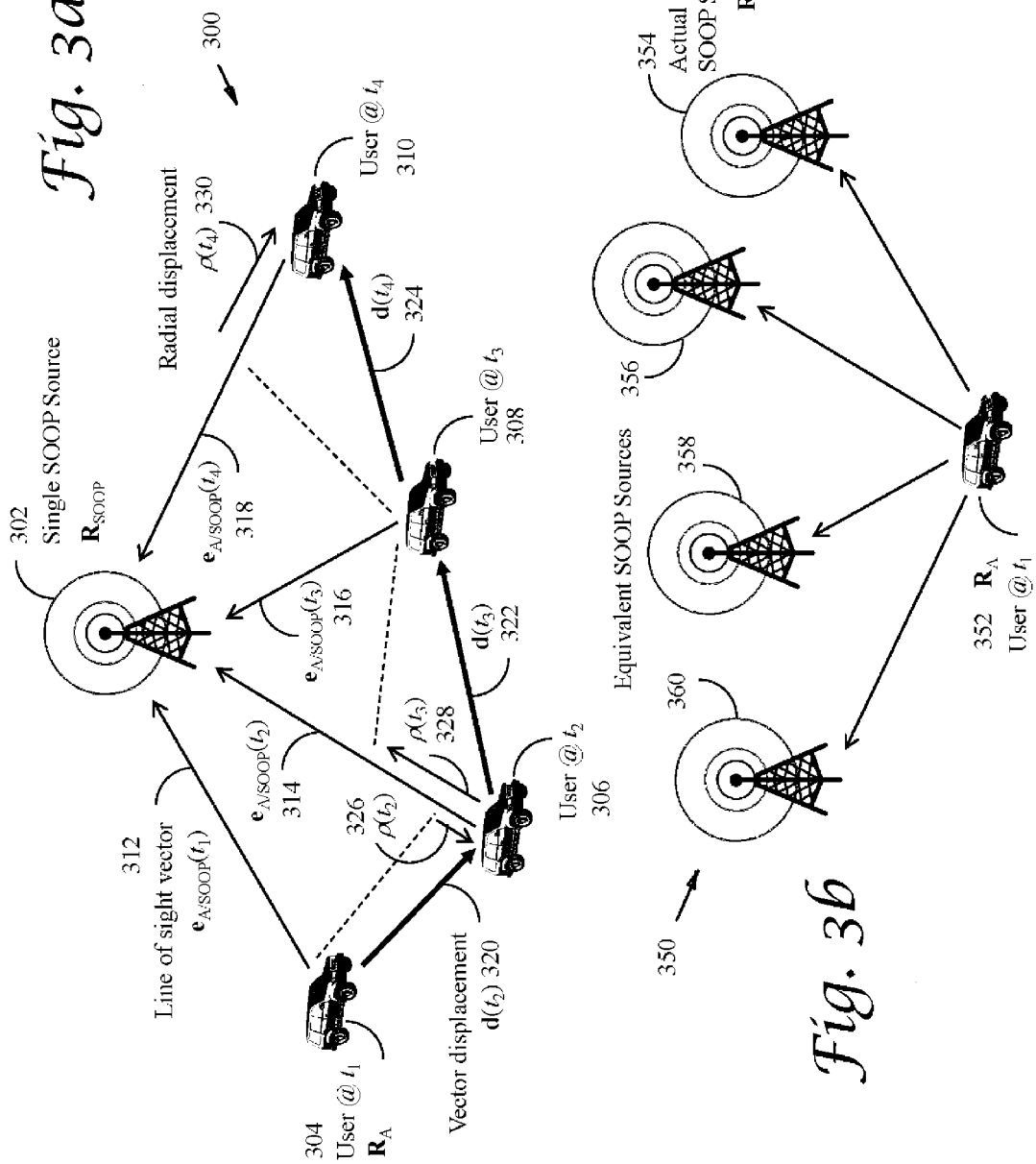

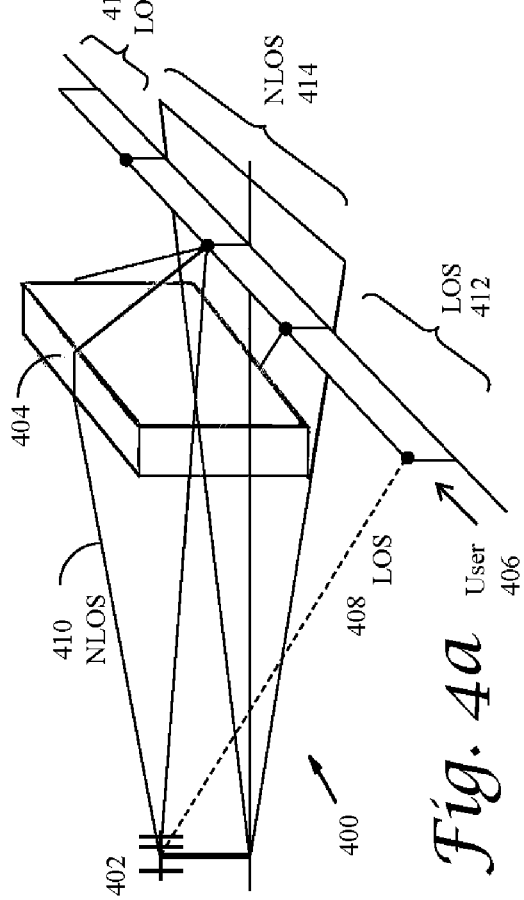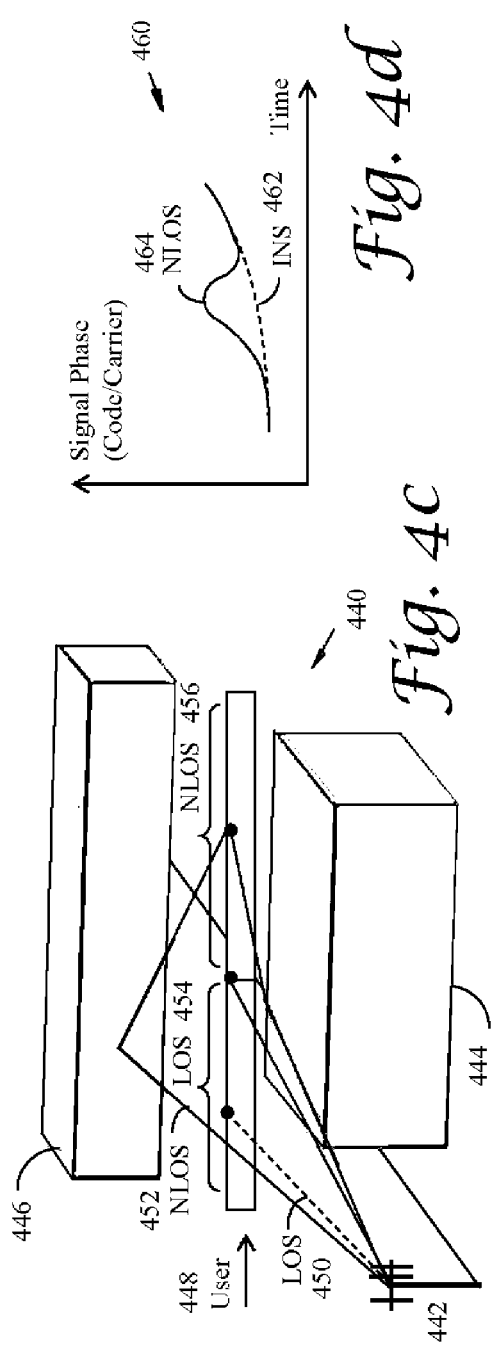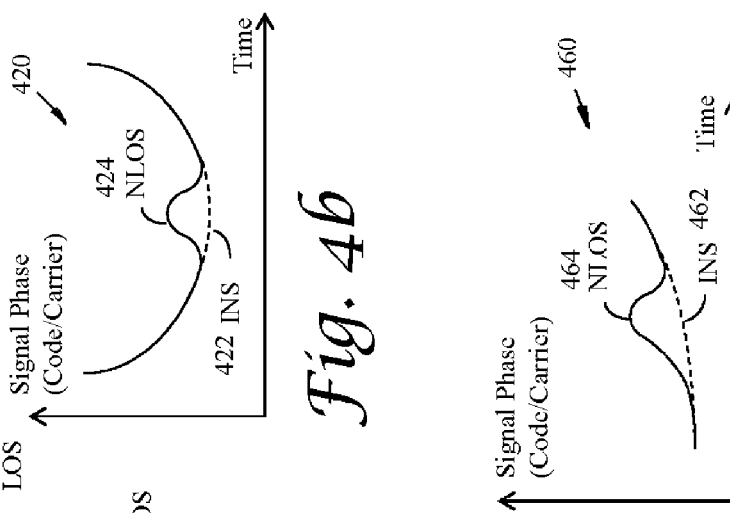

METHOD AND APPARATUS FOR FUSING REFERENCED AND SELF-CONTAINED DISPLACEMENT MEASUREMENTS FOR POSITIONING AND NAVIGATION

RELATED APPLICATIONS

This application is a continuation-in-part of U.S. patent application Ser. No. 12/436,868, filed May 7, 2009 now U.S. Pat. No. 8,063,825.

BACKGROUND OF THE INVENTION

1. Field of the Invention

The present invention relates to methods and devices for positioning and navigations using dead-reckoning sensor measurements. More particularly, the present invention relates to fusing a plurality of linear and angular displacement measurements from dead-reckoning sensors with mutual calibration and aiding for positioning and navigation.

2. Description of the Prior Art

Dead-reckoning is one of the oldest arts in the human positioning and navigation history. By measuring displacements made over short periods of time, a person can infer his or her current position through adding the displacements up from a known starting point as long as the direction of the displacements is also measured relative to a common reference frame. Sea-goers in the old times threw tethered logs into water and counted the number of knots on the tether rope dragged by the log in the water to estimate the speed relative to the current. The ship's heading was typically determined by the needle of a magnetic compass (or in reference to some known celestial bodies). The floating log and the compass needle (or the visible stars) measure the linear and angular displacements in reference to the water and magnetic north (or the stars in the sky), respectively, and such measurements will be referred to as referenced displacement measurements.

Other examples of referenced displacement measurements include a wheeled odometer, which relies on wheels rolling on the ground to measure the distance traveled along the surface. Recently, the displacement of objects in the image plane (the optical flow) has been used to construct the so-called visual odometer, which enables the measurement of movement of a video camera relative to the imaged objects. A pedometer, which counts the steps when one walks, also provides referenced dead-reckoning measurements. The Doppler principle has also been used to measure the ground velocity of an airborne radar and a laser scanner is used to measure the change in range to stationary objects.

Displacement measurements can also be made without physical interaction with external objects or environments in a self-contained manner. Examples include accelerometers and gyroscopes. Earlier mechanical designs employed a proof mass and a spinning or vibrating mass for measuring linear and angular displacements, respectively. Because of their use of the inertial property of the mass, they are called inertial sensors, which are still used in today's miniature microelectromechanical systems (MEMS). Strictly speaking, inertial sensors interact with the gravity field, which is invisible. Newer designs use fiber optical and ring laser and even atomic gyros.

However, dead-reckoning based navigation solutions experience growing errors due to the accumulation of bias, drift, scale factor, and misalignment errors of the dead-reckoning sensors. Navigation aids (navaids) are frequently used to update the dead-reckoning solutions so as to curb the error growth while calibrating the sensor error terms.

An increasingly popular navigation device is the Global Positioning System (GPS) receiver. As a satellite radio navigation device, GPS provides a reliable, precise, uniform, and stable solution as long as the sky is directly visible. By measuring the distances to at least four GPS satellites, a GPS receiver can solve for the receiver's position location and time offset. The distance, also called pseudorange, is measured in terms of the time for a radio signal to travel from a GPS satellite to the receiver. The time of transmission is encoded in the navigation message modulated on the radio signal whereas the time of arrival (TOA) is obtained from that of the modulating code at the receiver. The time of arrival can be measured to the accuracy of a fraction of a code chip (one chip duration of the coarse acquisition (C/A) code is about 0.978 us or 293 m) or code phase. High-end GPS receivers measure the range in terms of the radio carrier cycles (carrier phase), which is 1540 times (1575.42 MHz vs. 1.023 MHz) shorter than the C/A code chip, thus much more accurate. Since a GPS receiver only measures the carrier phase within a cycle not the whole cycles, advanced algorithms have been developed to solve the integer cycle ambiguity before the carrier phase can be used in ranging for position fixing.

However, GPS solution is severely degraded, if not unavailable at all, in urban and indoor environments, because of the blockage of direct line of sight (LOS) view of GPS satellites. Recently, a number of terrestrial radio signals that are used for broadcast (TV and AM/FM) and wireless communications (cell phone networks) have been used in a way similar to GPS. Since these radio signals are not originally intended (designed) for positioning but are freely available all the time and everywhere (within a certain range) with known characteristics that can be used for positioning, they are often called signals of opportunity (SOOP). Most broadcast and wireless communication signals are designed for use in urban and indoor environments where GPS is most likely to fail.

However, there are serious technical obstacles in positioning with SOOP. Notably, the SOOP transmitters are not synchronized, each subject to a different bias and drift. There is no explicit timing information coded on the signals. At reception, multipath is of serious concern particularly in an urban environment. More importantly, there may not have enough "independent" SOOP, resulting in a rather poor geometric dilution of precision (GDOP).

To solve the problem of not knowing the time of transmission, the idea of using a network of monitor stations installed at known locations that estimate the time of transmission and then send it to users is disclosed by M. Rabinowitz and J. J. Spilker Jr. in the U.S. Pat. No. 6,861,984 entitled, Position Location Using Broadcast Digital Television Signals, issued Mar. 1, 2005. Other methods to deal with unknown times of transmission and to improve poor geometry with few "independent" SOOP are a self-calibration technique disclosed in the U.S. Pat. No. 7,388,541 entitled, Self-Calibrating Position Location Using Periodic Codes in Broadcast Digital Transmissions, issued June 2008 and a cooperative technique disclosed in the U.S. patent application Ser. No. 12/436,868, entitled, Cooperative Position Location Using Periodic Codes in Broadcast Digital Transmissions (May 7, 2009), both by one of the present co-inventors.

Instead of using code-derived range measurements, which needs to solve for the unknown time of transmission, wide-lane techniques that were originally developed for GPS carrier phase were applied to broadcast signals as disclosed by G. Opshaug et al. in the U.S. Pat. No. 7,498,873 entitled, Wide Lane Pesuodrange Measurements Using FM Signals, issued March 2009. Wide lane is in fact a popular technique widely used in GPS to facilitate the integer cycle ambiguity resolution. Temporal carrier phase difference is another technique that actually does not require ambiguity resolution, which was successfully applied to GPS signals as disclosed in the article by F. van Graas and S.-W. Lee entitled, "High-Accuracy Differential Positioning for Satellite-Based Systems without Using Code-Phase Measurements," appearing in *Navigation: Journal of the Institute of Navigation*, Vol. 42 No. 4, 1995.

Sequential changes in carrier phase (or phase changes accumulation or accumulated Doppler) can serve as dead reckoning measurements, also noted in a recent magazine column by James L. Farrell entitled, "Between the Lines: A Fortuitous Meeting," appearing in *GPS World* (Sep. 24, 2010). This radio dead reckoning actually provides a linear displacement along the radial direction toward the signal source, thus being a referenced dead reckoning measurement. Indeed, simultaneous tracking of three or more fixed radio transmitters enables position location as disclosed by Ell J. Dalabakis and Harry D. Shearer in the U.S. Pat. No. 3,747,106, entitled, Navigation System Utilizing Plural Commercial Broadcast Transmissions, issued Jul. 17, 1973.

However, by itself, riding radio waves for positioning and navigation runs into serious issues in practice particularly in urban environments. One issue is the lack of sufficient independent signal sources to form a good solution geometry. Another issue is the omnipresence of multipath and non-line-of-signal (NLOS) signals. Multipath creates the so-called fading phenomena, which may disrupt signal reception and lead to discontinuity in navigation solution. If NLOS measurements are incorporated into the solution process, the overall navigation accuracy can be severely degraded. Therefore, it is important to identify NLOS multipath signals to exclude them from being used in navigation solution.

Clearly, self-contained and referenced linear and angular displacements measurements from dead-reckoning sensors have their own advantages yet their separate uses are subject to practical difficulties they cannot overcome on their own. A need therefore exists for a positioning and navigation system that combines the advantages of dead-reckoning measurements of complementary nature while providing mutual aiding and calibration to overcome the disadvantages. This need is met by the present invention as described and claimed below.

As compared to the prior art, the present invention introduces a number of innovations. First, it employs the fusion technique that combines temporal carrier phase changes and dead-reckoning sensors to estimate the absolute position, not just the relative position states. Second, it does not require continuous carrier phase tracking, i.e., the methods disclosed herein can operate on intermittently tracked carrier phase measurements. Third, as a general approach, it does not depend on a specific type of signal transmitting system such as GPS. For example, the GPS carrier phase positioning method by F. van Graas and S. W. Lee mentioned earlier approximates the transmitter and user geometry by assuming that the transmitters are far away. The present invention does not make such an assumption. In fact, the use of "close" transmitters actually improves the convergence of the absolute position estimation due to faster geometry changes and explicit inclusion of line-of-sight (LOS) vector error terms that are directly related to the absolute position states. Finally, the disclosed algorithms and methods enable robust operation in dense multipath environments and in the presence of NLOS signals.

SUMMARY OF THE INVENTION

The present invention is a corrected dead-reckoning device and associated method that combines radial and vector displacement measurements, respectively, from a radio receiver and an inertial measurement unit in a mutual-aiding and mutual-calibration manner to afford an improved positioning and navigation solution.

The disclosed method contains a number of intertwined parts. First, the ranges to radio sources at known locations are coarsely estimated from the received signal strength indication (RSSI), from which an initial estimate of the position location of the radio receiver is obtained via multilateration. Similarly, an initial attitude is estimated from gravity, earth rotation, and magnetic north measurements.

Since an instantaneous geometry between the radio receiver and radio sources is generally poor (i.e., not widely spread) for position location purpose, sufficient geometry diversity is then accumulated over time by observing radio sources from different locations as the user is traveling.

Next, the estimation accuracy is refined using radio signal carrier phase measurements. Radio signal carrier phase measurements at consecutive sampling time instants (under the phase lock condition) are differentiated to calculate the temporal carrier phase change in terms of integer and fractional cycles. This step eliminates the integer cycle ambiguity otherwise involved in the use of carrier phase measurement taken at a single time instant.

On the one hand, carrier phase positioning makes use of temporal carrier phase differences that are related to the projection of a user's position vector onto the change in the source to user line-of-sight (LOS) unit vector, which is maintained by the inertial solution. On the other hand, radio signal carrier phase changes are applied for the inertial error estimation, thus enabling accurate estimation of the absolute velocity states and absolute attitude states.

Finally, the radio navigation contains three-stage multipath mitigation at signal processing, measurement processing, and position estimation levels, respectively, thus ensuring robust performance in dense multipath environments.

BRIEF DESCRIPTION OF THE DRAWINGS

For a better understanding of the present invention, reference is made to the following description of an exemplary embodiment thereof, considered in conjunction with the accompanying drawings wherein:

FIG. 2 is a schematic drawing illustrating an exemplary embodiment of method steps including code and carrier tracking loops that generate referenced dead-reckoning measurements using radio signal sources;

FIG. 3a is a drawing graphically illustrating an exemplary geometry wherein a mobile user takes vector displacement measurements at different time instants when traveling around a single signal of opportunity (SOOP) source and radial displacement measurements to that SOOP source;

FIG. 3b is a drawing graphically illustrating an exemplary geometry equivalent to that of FIG. 3a as if the mobile user were stationary and there were multiple SOOP sources at different locations (the single SOOP source moved to different locations), thus creating a favorable geometry condition for solving position location;

FIG. 4a is a drawing graphically illustrating an exemplar urban environment wherein a mobile user's reception of line of sight (LOS) signals is blocked by a large building once in the building's shadow yet the user is able to receive non line of sight (NLOS) signals that are diffracted by the building;

FIG. 4b is a drawing graphically illustrating an exemplar time history of signal phase wherein a large change occurs to code or carrier during the signal appearance of NLOS signals whereas an inertial solution remains smooth;

FIG. 4c is a drawing graphically illustrating an exemplar urban environment wherein a mobile user's reception of LOS signals is blocked by a large building on one side of the street once in the building's shadow yet the user is able to receive NLOS signals that are reflected by a building on the other side of street;

FIG. 4d is a drawing graphically illustrating an exemplar time history of signal phase wherein a large change occurs to code or carrier the signal appearance of NLOS signals whereas an inertial solution remains smooth.

Figure 1:
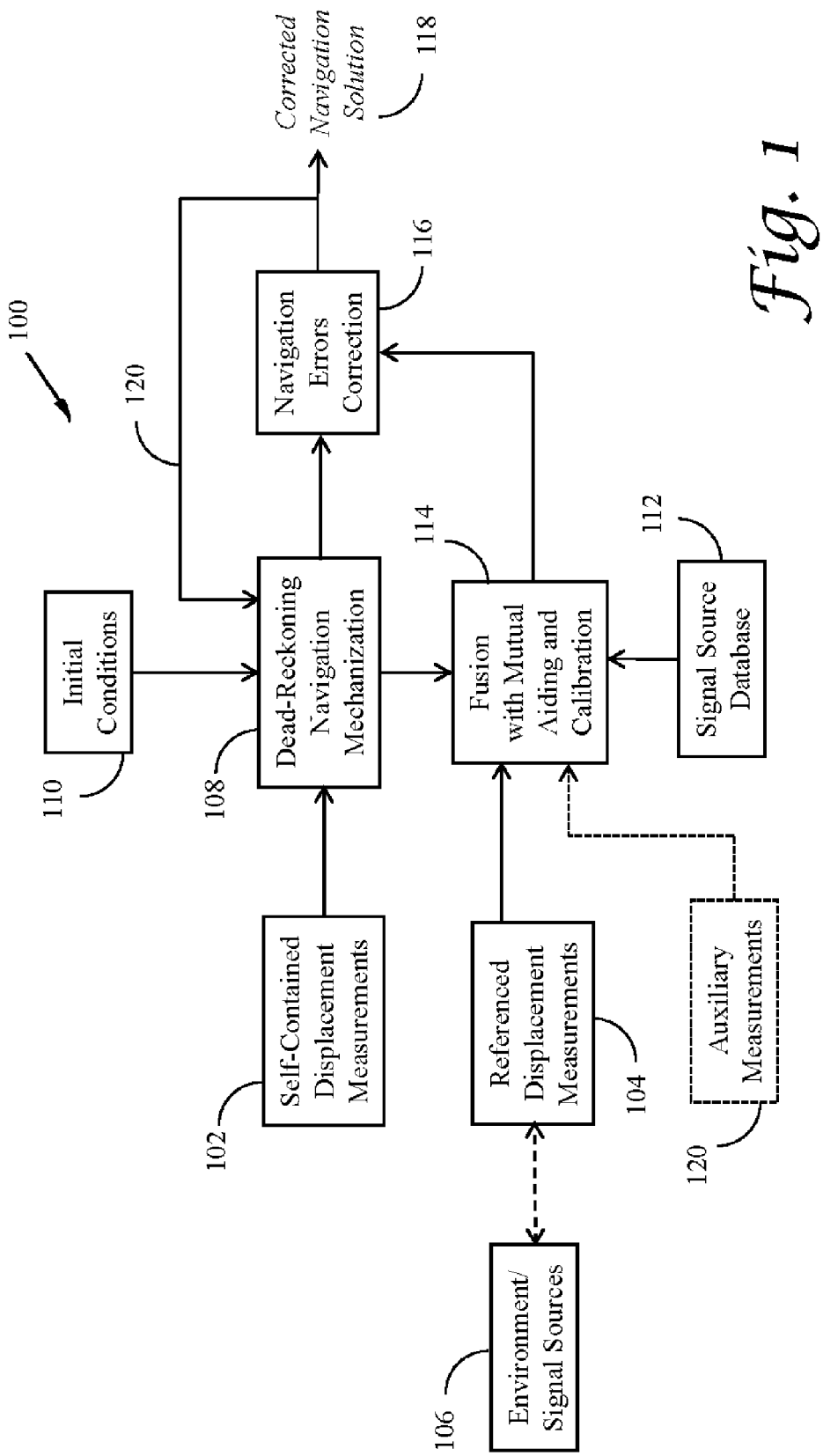
FIG. 1 is a schematic drawing illustrating an exemplary embodiment of the present invention including an integration system with mutual aiding and calibration that receives self-contained dead-reckoning, referenced dead-reckoning, and auxiliary sensor measurements as well as initial conditions to afford a corrected navigation solution.

The leading digit of each reference numeral used in this specification indicates the number of the drawing in which the reference numeral first appears.

DETAILED DESCRIPTION OF THE INVENTION

Although the present invention system and method can be used with other radial and vector displacement measurements, the present invention system and method are particularly well suited for radial and vector displacement measurements generated by radio receivers and inertial measurement units, respectively. Accordingly, an exemplary embodiment of the present invention will be described in an application of positioning and navigation using radio receivers and inertial measurement units.

Referring to drawings, and initially to FIG. 1, an exemplary embodiment of the present invention methodology 100 is shown wherein self-contained displacement measurements 102 and referenced displacement measurements 104 that are derived from the interaction with environment and/or signal sources 106 are utilized.

Dead-reckoning navigation mechanization 108 propagates self-contained dead-reckoning measurements 102 from given initial conditions 110 to update dead-reckoning navigation states. In one embodiment, a dead-reckoning navigation mechanization maintains a relative navigation solution that includes the navigation states of relative position, velocity and orientation states that are resolved in the relative frame defined by the position and orientation of the user's body-frame at the system startup time. In another embodiment, an inertial navigation mechanization can maintain an absolute navigation solution.

Dead-reckoning navigation states from dead-reckoning navigation mechanization 108 and referenced displacement measurements 104 are combined via fusion with mutual aiding and calibration to compute the overall navigation solution 114, which requires the coordinates of radio signal sources whose location is known and stored in the signal source database 112. The fusion block 114 estimates navigation error corrections 116 that are applied to dead-reckoning navigation states 108 in order to reduce dead-reckoning sensor error terms, which is part of the mutual aiding and mutual calibration process, further elaborated later in this specification. Corrected dead-reckoning navigation solution 118 and motion states are fed back 120 as the initial conditions for subsequent operations. Data fusion can also incorporate auxiliary measurements such as measurements of magnetometers and inclinometers 120 to further increase the overall navigation accuracy.

To enable absolute navigation from relative navigation solution, a radio receiver that provides measurements of broadcast and/or wireless communication signals with their transmitters (such as digital TV towers or cellular phone base station towers) at known locations can be used. FIG. 2 shows an exemplary embodiment 200 of such a receiver that provides referenced displacement measurements 104, previously referenced in FIG. 1.

An antenna and RF front-end 202 receive signals from a plurality of sources 204 and down-convert them to a baseband. Depending on a specific signal, the down-conversion frequency and bandwidth can be adjusted via radio signal and band selection 206. The signal tracking component first implements a coarse estimation of signal parameters by performing fast code phase and carrier frequency acquisition and/or re-acquisition 208. Acquisition results are then utilized to initialize signal tracking loops that refine signal parameter estimates.

An exemplary tracking loop 222 includes generation of replica code and carrier signals 210, code and carrier error discriminators 214 that include multipath mitigation (such as a high-resolution correlator and phase-only filter), code and carrier error filters 214, and use of the filtered error signals to feed numerically controlled oscillators 216 that are utilized in turn to drive the generation of replica signals 210.

Estimates of incoming signal parameters 218 can include signal ID, signal strength, code phase, and carrier phase. These estimates can be derived directly from numerically controlled oscillators 216 and/or from error filter outputs 214. These estimates are applied for the fusion 114 with dead-reckoning navigation solution 108. The receiver implementation serves as an exemplary implementation that provides reference displacement measurements. Other receiver implementations such as open-loop estimation of signal parameters for various radio-frequency signal sources can be readily adapted. Indeed, one technique is disclosed by one of the present co-inventors in the U.S. Pat. No. 6,407,699 entitled, Method and Device for Rapidly Extracting Time and Frequency Parameters from High Dynamic Direct Sequence Spread Spectrum Radio Signals under Interference, issued Jun. 18, 2002. Another technique is disclosed by one of the co-inventors in the U.S. Pat. No. 7,471,241 entitled, Global Navigation Satellite System (GNSS) Receivers Based on Satellite Signal Channel Impulse Response, issued Dec. 30, 2008. A multipath mitigation technique is disclosed by one of the co-inventors in the paper entitled, "Symmetric Phase-Only Matched Filter (SPOMF) for Frequency-Domain Software GPS Receivers," appearing in the *Institute of Navigation Journal: Navigation*, Vol. 54, No. 1, Spring 2007, pp 31-42. These disclosures are incorporated into this specification by reference.

A key component of the present invention is the use of temporal carrier phase difference for the estimation of absolute navigation states, which is disclosed below in detail. In reference to FIG. 3a, a carrier phase measurement for a mobile user can be written as:

$$\tilde{\phi} = \rho_{A/SOOP} + \lambda_{SOOP} N + c\delta t_A + c\delta t_{SOOP} + \eta \qquad \text{(Equation 1)}$$

where $\tilde{\phi}$ is the measured carrier phase in wavelength.

$\rho_{A/SOOP}$ is the true range between a radio signal of opportunity (SOOP) source 302 and a user at different time instances 304, 306, 308, 310.

$\lambda_{SOOP}$ is the SOOP carrier wavelength.

N is the integer ambiguity.

c is the speed of light.

$\delta t_A$ and $\delta t_{SOOP}$ are clock biases of radio receiver and radio sources, respectively.

$\eta$ is the measurement error including thermal noise, multipath, and propagation errors.

To remove the integer ambiguity N, carrier phase measurements are differenced over time:

$$\Delta^n{}_0\tilde{\phi}=\tilde{\phi}(t_n)-\tilde{\phi}(t_0)=\Delta^n{}_0\rho_{A/SOOP}+c\Delta^n{}_0\delta t_A+c\Delta^n{}_0\delta t_{SOOP}+\Delta^n{}_0\eta \quad \text{(Equation 2)}$$

where $t_n$ is the current time and $t_0$ is the system start-up time.

The change in the true range $\Delta^n{}_0\rho_{A/SOOP}$ in (2) can be directly related to the user's absolute position. In order to derive this relationship, refer to FIG. 3a, which illustrates the SOOP/user geometry in the absolute coordinate frame. FIG. 3a uses the following nomenclature. XYZ is the absolute coordinate frame (ECEF or NED).

$R_{SOOP}$ is the SOOP position vector known in the absolute frame.

$R_A$ is the unknown user position vector resolved in the absolute frame.

$e_{A/SOOP}$ is the user-to-SOOP LOS unit vector 312, 314, 316, 318 observed by the user from different locations at time instances 304, 306, 308, 310, respectively.

From the geometry shown in FIG. 3a, the true range can be represented as:

$$\rho_{A/SOOP}=(e_{A/SOOP},R_{SOOP}-R_A) \quad \text{(Equation 3)}$$

where (,) stands for the dot product between two vectors. Accordingly, the change in the true range over time (radial displacements 326, 328, and 330 at $t_1$, $t_2$, and $t_3$, respectively) is computed as Equation 4, below.

$$\Delta_0^n \rho_{A/SOOP} = \rho_{A/SOOP}(t_n) - \rho_{A/SOOP}(t_0) =$$
$$(e_{A/SOOP}(t_n), R_{SOOP} - R_A(t_n)) - (e_{A/SOOP}(t_0), R_{SOOP} - R_A(t_0)) =$$
$$(e_{A/SOOP}(t_n) - e_{A/SOOP}(t_0), R_{SOOP}) - (e_{A/SOOP}(t_n), R_A(t_n)) +$$
$$(e_{A/SOOP}(t_0), R_A(t_0)) = (\Delta_0^n e_{A/SOOP}, R_{SOOP}) -$$
$$(e_{A/SOOP}(t_n), R_A(t_n) - R_A(t_0) + R_A(t_0)) + (e_{A/SOOP}(t_0), R_A(t_0)) =$$
$$(\Delta_0^n e_{A/SOOP}, R_{SOOP}) - (e_{A/SOOP}(t_n), R_A(t_n) - R_A(t_0)) -$$
$$(e_{A/SOOP}(t_n) - e_{A/SOOP}(t_0), R_A(t_0)) =$$
$$(\Delta_0^n e_{A/SOOP}, R_{SOOP}) - (e_{A/SOOP}(t_n), \Delta_0^n R_A) - (\Delta_0^n e_{A/SOOP}, R_A(t_0))$$

In Equation 4, it is taken into account that SOOP sources are stationary and their position does not change over time. Equation 4 relates the unknown absolute position at the initial time, $R_A(t_0)$, to the change in the true range. That is, the third term of this equation is a projection of the true range onto the change in the SOOP/user LOS unit vector. Hence, the initial absolute position of a user can be estimated from carrier phase changes that are directly related to changes in the true range as formulated by (3). This initial position estimate is then propagated to the current time using the dead-reckoning-based relative solution.

The carrier phase change (2) is further modified as Equation 5, below.

$$\Delta^n{}_0\tilde{\phi}(\Delta^n{}_0 e_{A/SOOP},R_{SOOP})-(e_{A/SOOP}(t_n),\Delta^n{}_0 R_A)-(\Delta^n{}_0 e_{A/SOOP},R_A(t_0))+c(\Delta^n{}_0\delta t_A+\Delta^n{}_0\delta t_{SOOP})+\Delta^n{}_0\eta$$

The first two terms on the right hand side of Equation 5 can be compensated for. The remaining two terms allow for an accurate estimate of the initial absolute position $R_A(t_0)$. More specifically, the first term of Equation 5, $(\Delta^n{}_0 e_{A/SOOP}, R_{SOOP})$, can be estimated from the known value of $R_{SOOP}$ and LOS unit vectors $\Delta^n{}_0 e_{A/SOOP}$ based on the known $R_{SOOP}$ and an approximately known positions of the user $R_A(t_0)$ and $R_A(t_n)$.

The second term, $(e_{A/SOOP}(t_n), \Delta^n{}_0 R_A)$, can also be estimated from the LOS unit vector as described above and the relative position solution provided by the dead-reckoning mechanization to compute the position change vector $\Delta^n{}_0 R_A$ (vector displacements 320, 322, 324 at $t_1$, $t_2$, and $t_3$, respectively).

The absolute position $R_A(t_0)$ is then estimated from the linear combination of $-(\Delta^n{}_0 e_{A/SOOP}, R_A(t_0))+c(\Delta^n{}_0\delta t_A+\Delta^n{}_0\delta t_{SOOP})$. The estimation procedure further includes the combined SOOP/user clock term $\Delta^n{}_0\delta t_A+\Delta^n{}_0\delta t_{SOOP}$, modeled as a linear drift, which is part of the mutual aiding and mutual calibration process. The ability to separate this linear drift term from the position term is defined by the change in the LOS unit vector $\Delta^n{}_0 e_{A/SOOP}$: the more change experienced over time, the better is the state observability and, by consequence, the better is the position estimation accuracy.

An instantaneous radio signal measurement geometry may be quite poor due to the lack of a sufficient number of independent signal sources (widely spaced): a large geometrical dilution of precision (GDOP) factor may result. In this case, the motion of a user can be utilized to improve the GDOP by observing radio signal measurements over time at different locations. In a sense, the relative position solution is applied to aid the absolution navigation solution.

More specifically, the carrier phase positioning mechanism utilizes a user's motion to observe SOOP sources from different locations in order to accumulate a geometry change that is sufficient for accurate extraction of absolute position information from carrier phase changes. The dead-reckoning relative position solution is applied to aid the geometry accumulation process by estimating the vector displacement components 320, 322, and 324 and utilizing the estimates to compensate for radial displacement terms 326, 328, and 330 for changes in the user location. Application of the motion compensation makes it look like as if the user is stationary while SOOP sources are moving over a known trajectory. As soon as this motion generates a sufficient change in the SOOP/receiver geometry, accurate absolute position information can be extracted from carrier phase measurements.

FIG. 3b illustrates this principle. Multiple radio sources are generated synthetically by observing a single SOOP source from different locations of the user. The relative navigation solution is applied for the motion compensation. That is, to transfer SOOP measurements to a single point of timing reference (fixed-point smoothing), i.e., to the user location 352 at time $t_0$. As a result, it effectively looks like that multiple sources are available including the actual SOOP source 354 and synthetic sources 356, 358, and 360. This synthetic generation of multiple sources is efficient for the measurement error averaging but most importantly for improving the measurement geometry. A technique to use a user's motion to improve geometry for position location solution is disclosed by one of the co-inventors in the U.S. Pat. No. 7,388,541 entitled, Self-Calibrating Position Location Using Periodic Codes in Broadcast Digital Transmissions, issued Jun. 17, 2008, which is incorporated into this specification by reference.

The carrier phase positioning method disclosed above can be implemented in the form of a complementary Kalman filter. Changes in carrier phase measurements over consecutive measurement epochs are used by the Kalman filter instead of the overall phase change (i.e., from the start-up time to the current time) as in Equation 5. This is because the use of the overall phase change requires continuous phase tracking during the entire operation of the Kalman filter, which may be problematic in harsh operational conditions such as urban environments. In contrast, the use of consecutive phase changes only requires continuous tracking between two measurement epochs, which is much less stringent. If it is detected that carrier phase of a certain SOOP was not tracked consistently over a measurement interval (for example, a cycle slip is detected), then this SOOP signal is simply not used for the filter update. The signal can be used again as soon as its carrier phase tracking is recovered.

For the case with consecutive carrier phase changes, Equation 5 is modified as Equation 6, as expressed below.

$$\Delta^n_{n-1}\tilde{\phi} = (\Delta^n_{n-1}e_{A/SOOP}, R_{SOOP}) - (e_{A/SOOP}(t_n), \Delta^n_{n-1}R_A) - (\Delta^n_{n-1}e_{A/SOOP}, R_A(t_0) + \Delta^n_{-1,0}R_A) + c(\Delta^n_{n-1}\delta t_A + \Delta^n_{n-1}\delta t_{SOOP}) + \Delta^n_{n-1}\eta$$

Equation 6 is applied to formulate complementary observables for the Kalman filter, as expressed by Equation 7 below.

$$y_{Kalman} = \Delta^n_{n-1}\tilde{\phi} - (\Delta^n_{n-1}\hat{e}_{A/SOOP}, R_{SOOP}) + (\hat{e}_{A/SOOP}(t_n), \hat{C}_{Rel}^N \hat{R}_A^{Rel}(t_n) - \hat{C}_{Rel}^N \hat{R}_A^{Rel}(t_{n-1})) + (\Delta^n_{n-1}\hat{e}_{A/SOOP}, \hat{R}_A(t_0) + \hat{C}_{Rel}^N \hat{R}_A^{Rel}(t_{n-1}))$$

where $\hat{R}_A^{Rel}$ is the relative navigation solution that is computed by the dead reckoning module.

$\hat{C}_{Rel}^N$ is the estimate of the coordinate transformation matrix from the relative frame to the absolute navigation frame.

$\hat{e}_{A/SOOP}(t_n)$ is the LOS unit vector that is computed based on the SOOP position and an estimate of the user position as presented below in Equation 8.

$$\hat{e}_{A/SOOP}(t_n) = \frac{R_{SOOP} - \hat{R}_A(t_0) - \hat{C}_{Rel}^N \hat{R}_A^{Rel}(t_n)}{\left\| R_{SOOP} - \hat{R}_A(t_0) - \hat{C}_{Rel}^N \hat{R}_A^{Rel}(t_n) \right\|}$$

where $\|\ \|$ is the Euclidian vector norm.

The nonlinear measurement observables of Equation 7 are linearized around the estimation errors using the first-order Taylor series expansion to formulate linear observations for the Kalman filter as expressed below by Equation 9.

$$y_{Kalman} = (\Delta^n_{n-1}\hat{e}_{A/SOOP}^T + H_e)\delta R_A(t_0) + H_\theta \delta\theta_{Rel}^N + H_R \delta R_A^{Rel} + c(\Delta^n_{n-1}\delta t_A + \Delta^n_{n-1}\delta t_{SOOP}) + \Delta^n_{n-1}\eta$$

where $\delta R_A(t_0)$ is the error in the absolute position estimate.

$\delta\theta_{Rel}^N$ is the error in the relative/absolute attitude.

$\delta R_A^{Rel}$ is the error in the relative position solution.

$H_e$, $H_\theta$, $H_R$ are matrices computed by the Taylor series first-order expansion procedure. For instance, $H_e$ characterizes a first-order transformation of absolute position error through unit vector computations into Kalman measurement observables.

Equation 9 takes into account errors in LOS unit vectors that are due to errors in the absolute position estimate. Since some of radio sources (such as digital television towers and cellular phone base stations) may be quite close to the user, their absolute position errors are transformed into the LOS vector errors, which may be large enough to be ignored. Within a certain limit, the existence of such non-negligible errors is actually beneficial for the estimation of absolute position because the error transformation mechanism creates additional time-varying multipliers for the absolute position error states in the formulation of Kalman filter measurement observables. These multipliers are represented by matrix $H_e$ in Equation 9. As a result, the observability of absolute position error states improves, which enhances the absolute positioning accuracy.

The Kalman filter estimates the errors in the absolute position solution, errors in the orientation between local and absolute frames, relative position errors and other error terms of the dead reckoning modules (i.e., velocity errors, attitude errors, and sensor error states) and clock error terms. The joint estimation of the error terms from self-contained vector displacement and referenced radial displacement measurements provides the mutual aiding and mutual calibration functionality of the carrier phase positioning mechanism. The Kalman filter-based estimation procedure is an exemplary implementation of the mechanism. The techniques for design and construction of a complementary Kalman filter that possesses the characteristics relevant to the present invention are well known to those of ordinary skill in the art. Specific implementation examples are disclosed by one of the co-inventors in the papers entitled, "Navigation in Difficult Environments: Multi-Sensor Fusion Techniques," appearing in the *NATO/OTAN RTO-EN-SET*-116 (2010), pp 9-1 through 9-27, and "Tight Coupling of GPS, INS, and Laser for Urban Navigation," appearing in the *IEEE Transactions on Aerospace and Electronic Systems*, Vol. 46, No. 4, October 2010, pp 1731-1746, respectively, which are incorporated into this specification by reference.

In urban and particularly indoor environments, natural and man-made objects reflect or diffract line of sight (LOS) signals coming directly from their sources, thus creating multiple signals arriving at the user from different directions along different paths, which are referred to as multipath signals. When the LOS signals are severely attenuated or totally blocked, there may be no direct signals but multipath signals, which are referred to as non line of sight (NLOS) signals.

Since multipath signals propagate along paths that are always longer than the direct signal, thus arriving later at the receiver. This propagation delay-induced phase offset between the direct and multipath signals cause them to interfere, either constructively or destructively, leading to the so-called fast-fading phenomena, which is more pronounced for close-in multipath.

The NLOS signals sometimes are desired for communication purposes because such signals can reach shadowed regions which the direct signal cannot. However, it is detrimental for ranging because this extra distance traveled by the signal, if not properly compensated for, leads to erroneous position estimates.

Referring to FIGS. 4a and 4c, two major mechanisms that create NLOS signals, namely, diffraction and reflection, are respectively illustrated. In both cases, the net effect on code and carrier phase measurements is a sudden increase in delay (or equivalently range). Without proper processing, this extra ranging error is translated into position errors in the navigation solution. In the example case of diffraction shown in FIG. 4a, the signal that is transmitted by a source 402 is diffracted by the obstacle 404. The user 406 receives a direct LOS signal 408 when the user is away from the obstacle 404. The user receives a NLOS signal 410 as the direct signal path becomes blocked by the obstacle. Hence, when the user is passing by the obstacle, it initially receives the LOS signal (during interval 412). Next, the LOS signal is replaced by the NLOS multipath (during the interval 414). Finally, the received signal switches back to its LOS component (during the interval 416).

In another example case of NLOS multipath shown in FIG. 4c, the signal is transmitted by the source 442. This signal is diffracted by the obstacle 444 while the obstacle 446 produces a NLOS signal reflection. The user 448 initially receives a direct signal 450. The direct signal is then substituted by the NLOS reflection 452. Direct signal is received during the interval 454 when direct signal is not blocked by the obstacle 444. NLOS multipath is received during the interval 456 when the obstacle 444 blocks the direct signal.

Conventional receivers are designed to track the strongest or earliest signals, which are assumed to corresponding to direct signals. However, in many environments, multipath signals can be significantly stronger than the direct signal. As a result, the receiver can lock onto and track a multipath signal instead of the direct signal. Clearly, if such NLOS measurements are incorporated into the estimation process, the overall navigation accuracy is severely degraded. Therefore, it is important to identify NLOS multipath signals to exclude their use in navigation algorithms.

Multipath is more critical for a stationary user than a mobile user. For a mobile user, the fast fading due to multipath is short-lived and averaging along trajectory can help to mitigate. For general efficient multipath mitigation, a three-stage approach is set forth in this specification in accordance with the present invention. It is based on tight integration of an inertial measurement unit (IMU), radio receivers, and a database containing radio source locations, which enables robust performance in dense multipath environments such as urban canyons and indoors. The disclosed method mitigates the influence of multipath at the signal processing level, the measurement processing level, and the estimation level.

First, for those cases wherein the radio receiver still tracks a direct signal, multipath errors can be efficiently mitigated at the signal processing level by using such methods as a symmetric phase-only matched filter. This level of mitigation is effective against close-in multipath as described in reference to FIG. 2.

Second, temporal carrier phase changes that are predicted based on the relative states of the inertial solution are compared with measured changes in carrier phase in order to identify NLOS measurements of a mobile user. Two methods can be used to deal with NLOS if detected at measurement processing level. A first mitigation method is "detection and exclusion from estimation." This method is good against large brief apperance of NLOS. Though effective, it is a waste of resources particularly during the initial stage prior to convergence if the signals are totally excluded. A second method is "weighting down in estimation." That is, one de-weights the suspicious measurements with a large measurement covariance matrix denoted R but still uses its observation matrix H. This is particularly useful when there is only a rather limited number of radio signals available. Such inclusion, albeit de-emphasized, provides a better geometry with a NLOS signal. To do so, the radio signal phase measurements can be inflated based on the value of the carrier phase residuals, which is particularly advantageous for cases wherein multipath errors are relatively small (i.e., the NLOS propagation path does not deviate from the direct one by too much).

Third, for slowly moving and stationary users, NLOS multipath errors are approximated by slowly varying biases, which can be estimated from range measurements and then removed. In addition, slant range due to topographic variation in elevation can be compensated for if the radio source elevations are known. At estimation level, two methods for dealing with NLOS multipath are formulated. The first method works best for stationary and slow-moving users wherein NLOS signals appear as a near-constant and slow varying bias. Therefore, we can "explicitly estimate the NLOS signals," which is facilitated by the displacement measurements from IMU or laser/vision. The second method applies tropospheric/topographic error correction. This is because the speed of radio signal changes when propagating through media as a function of weather conditions, e.g., air temperature, atmospheric pressure, and humidity. In addition, a terrain topographic map can be used to compensate for the effect of user altitude on the surface of the earth.

The weather information in the vicinity of a receiver can be obtained via an online/onboard database or from the Internet or other sources such as National Oceanic and Atmospheric Administration (NOAA), from which the actual propagation velocity can be determined. Furthermore, radio geolocation with terrestrial transmitters is better suited for two-dimensional latitude/longitude position location because the vertical dimension (i.e., height above the ground) of transmitters is rather small compared to horizontal dimensions. In terrains with hills and valleys relative to a transmitter antenna's phase center, a user may not lie on the circle of constant range around a transmitter if the user has a different altitude even though its line of sight distance to the transmitter is the same as the circle radius. In this case, a terrain topographic map can be used to compensate for the effect of user altitude on the surface of the earth. An altimeter or a barometer can be used to obtain an estimate of (differential) altitude.

The NLOS multipath estimation therefore can switch among these operational modes, For example, when the motion falls below a certain threshold, say, a three sigma value for carrier phase, multipath biases are estimated from range measurements. Two nested hypothesis tests are used to chose, on the first level, between "$H_1$: moving" and "$H_0$: stopped," and, on the second level, between "$H_1$: multipath present" and "$H_0$: no multipath." The choice between hypotheses can either be binary or a weighted sum, which can be done again based on residual values.

The presence of a significant NLOS multipath can be identified by computing the user motion trajectory from radio measurements and comparing it with the trajectory prediction based on dead-reckoning solution (such as inertial). FIGS. 4b and 4c illustrate the approach. For the case of diffraction (shown in FIG. 4b), the inertial-based trajectory estimate 422 and SOOP-based trajectory estimate 424 stay in close agreement when the direct signal is tracked. Tracking of NLOS multipath causes deviations of the SOOP trajectory (solid line) from the user trajectory predicted based on inertial data (dashed line). Similarly, disagreements between the inertial-based trajectory estimate 462 (dashed line) and SOOP-based trajectory 464 (solid line) can be applied to identify NLOS multipath due to reflections as shown in FIG. 4d.

The multipath identification approach is formulated below in accordance with the present invention. During the time interval where NLOS dominates, the radio receiver measures range and carrier phase of the reflected or diffracted signal (denoted by $\rho_{MP}$) instead of the direct signal, which is computed as:

$$\rho_{MP} \| R_{SOOP} - R_{Reflector} \| + \| R_{Reflector} - R_A \| \qquad \text{(Equation 10)}$$

Carrier phase changes are predicted using the estimated states from the complementary Kalman filter as, Equation 11 below.

$$\Delta^n_{n-1} = (\Delta^n_{n-1 A/SOOP}, R_{SOOP}) - (_{A/SOOP}(t_n), \hat{C}_{Rel}{}^N \hat{R}_A{}^{Rel}(t_n) - \hat{C}_{Rel}{}^N \hat{R}_A{}^{Rel}(t_{n-1})) - (\Delta^n_{n-1} \hat{e}_{A/SOOP}, \hat{R}_A(t_0) + \hat{C}_{Rel}{}^N \hat{R}_A{}^{Rel}(t_{n-1})) + c(\Delta^n_{n-1} \delta t_A + \Delta^n_{n-1} \delta t_{SOOP}) - (\Delta^n_{n-1} \hat{e}_{A/SOOP}{}^T + H_e) \delta \hat{R}_A(t_0) - H_\theta \delta \hat{\theta}_{Rel}{}^N - H_R \delta \hat{R}_A{}^{Rel}$$

where $\delta \hat{R}_A(t_0)$ is the estimated error in the absolute position.

$\delta \hat{\theta}_{Rel}{}^N$ is the estimated error in the relative/absolute frame attitude.

$\delta\hat{R}_A^{Rel}$ is the estimated error in the relative position solution.

$\Delta''_{n-1}\delta\hat{t}_A + \Delta''_{n-1}\delta\hat{t}_{SOOP}$ is the estimated clock term.

All estimated error terms are provided by the complementary Kalman filter. Predicted carrier phase change is then compared to the measured carrier phase change:

$$\delta\phi = \Delta''_{n-1}\tilde{\phi} - \Delta''_{n-1}\hat{\phi} \quad \text{(Equation 12)}$$

The carrier phase residual $\delta\phi$ is checked against a $3\sigma_{\delta\phi}$ threshold wherein $\sigma_{\delta\phi}$ is computed as:

$$\sigma_{\delta\phi} = \sqrt{H_{\delta\phi}P_{Kalman}H_{\delta\phi}^T + 2\sigma_\phi^2} \quad \text{(Equation 13)}$$

where $P_{Kalman}$ is the Kalman filter covariance matrix, $H_{\Delta\phi}$ defines the projection of Kalman filter states onto the carrier phase change prediction in which the absolute position error states $\delta R_A(t_0)$, absolute attitude error states $\delta\hat{\theta}_{Rel}^N$, relative position error states $\delta\hat{R}_A^{Rel}$, and a combined clock state $\Delta''_{n-1}\delta\hat{t}_A + \Delta''_{n-1}\delta\hat{t}_{SOOP}$ are all projected. The elements of $H_{\Delta\phi}$ are defined by the matrices $H_e$, $H_\Theta$, $H_R$ for the projection of absolution position, absolute attitude and relative position error states and for the projection of the combined clock state.

$\sigma_\phi$ is the standard deviation of the carrier phase measurement error wherein a factor of two is applied since the carrier phase difference combines two independent measurement errors at $t_{n-1}$ and at $t_n$, respectively.

If $|\delta\phi| > 3\sigma_\phi$, then measurements of the corresponding SOOP source (both carrier phase and range) are identified as unreliable and not applied directly for the estimation at the measurement epoch $t_n$. The carrier phase residual check is equally efficient for the identification of non-LOS multipath and for cycle slip monitoring.

Figure 5:
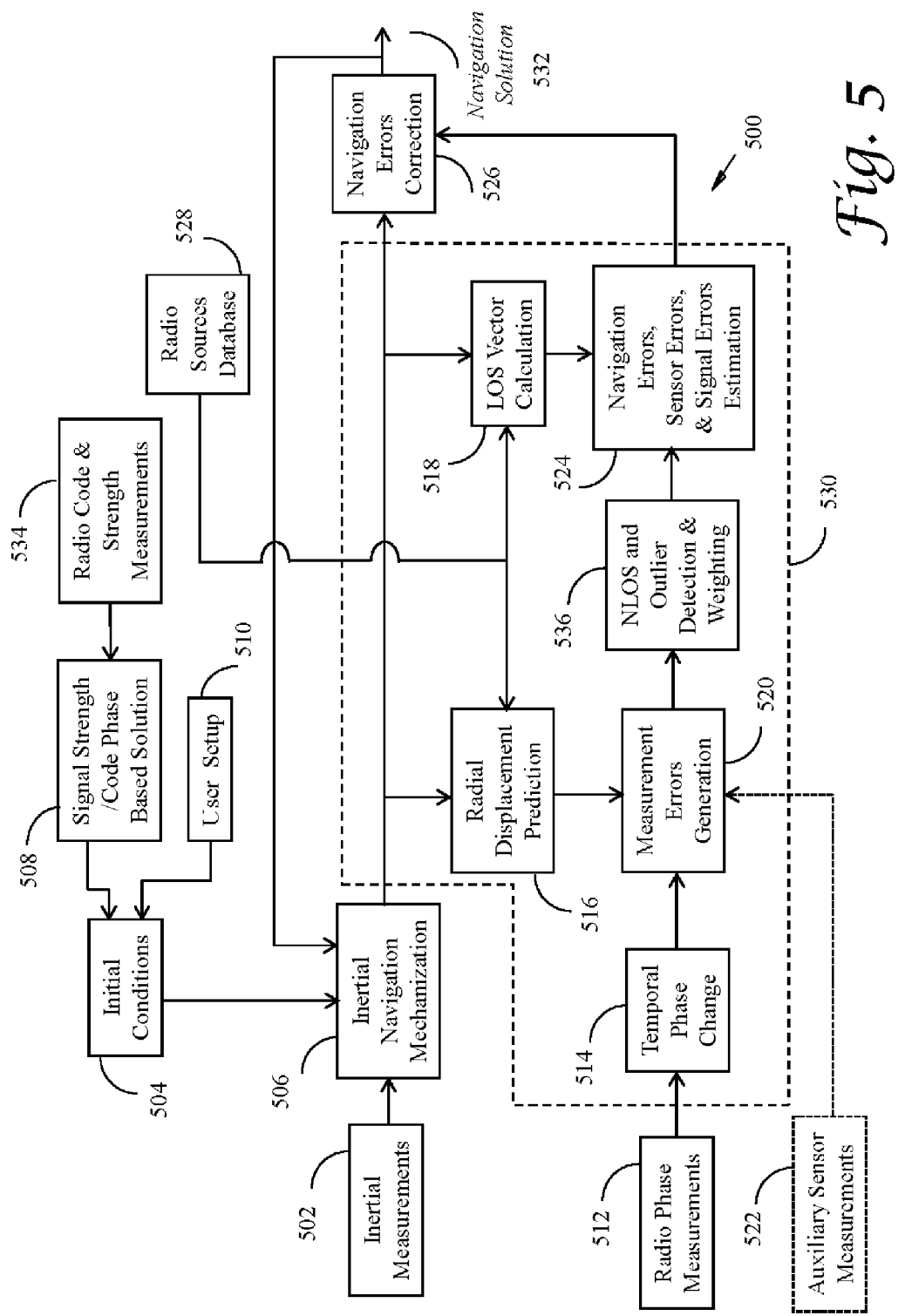
FIG. 5 is a schematic drawing illustrating an exemplary embodiment of method steps of estimating navigation errors and sensor errors using radio phase measurements that include initialization, NLOS and outlier detection and weighting, radial displacement prediction and LOS vector calculation in accordance with the present invention.

Referring to FIG. 5, an exemplary embodiment 500 of the subsystem for fusion with mutual aiding and mutual calibration 516 is shown, which combines dead-reckoning inertial measurements 502 with carrier phase measurements 514 to afford a corrected navigation solution 536.

Inertial navigation states are initialized with initial conditions 504, generally including position, velocity, and attitude states. These initial states are then periodically updated by the inertial navigation mechanization 506. The inertial states 504 can be initialized using, for instance, a coarse position solution 508 derived from signal strength or code phase radio-frequency measurements 510. Initial conditions 504 can be also setup by the user 512.

The exemplary embodiment 500 uses radio carrier phase measurements 514 to perform fusion 516 with inertial solution 506. Differences in radio phase measurements over time are computed. The resultant temporal phase change 518 is then compared to radio displacement prediction 520 that is computed based on inertial data 506, LOS vector calculation 522, and radio source coordinates derived from radio sources database 524. Differences between inertial-based predictions and actual temporal changes are applied for the measurement error generation 526 that outputs measurement error observables.

In addition to inertial data, measurements from auxiliary sensors 528 can be also incorporated into the computation of measurement error observables in order to improve the overall accuracy performance. Measurement error observables are first checked for the presence of NLOS multipath via NLOS and outlier detection and weighting block 530. Next, navigation errors, sensor errors, and signal errors are estimated in an integration filter 532 using a Kalman filter, unscented Kalman filter, particle filter, or one of their variants. Estimation results are used to provide navigation error corrections 534 that are in turn used to adjust the dead-reckoning navigation solution 506 to afford the overall navigation solution 536.

Although the description above contains much specificities, these should not be construed as limiting the scope of the invention but as merely providing illustrations of some of the presently preferred embodiments of this invention. For example, the present invention provides a generic signal processing architecture where many processing steps can be tailored to achieve a desired combination of functionalities. As a result, some steps may be made optional and others are omitted. Flexibility is also provided for design parameters tradeoff to best suit a particular application. As a preferred method, an inertial measurement unit (IMU) detailed in this specification may be substituted with other dead-reckoning devices to provide self-contained displacement measurements.

Reference has been made mostly to digital television and cellular phone signals to obtain radial displacement measurements but the present invention is equally applicable to broadcast digital radio/audio signals, WiMAX (Worldwide Interoperability for Microwave Access), wireless local area network (WLAN), and wireless personal area network (WPAN) signals, other terrestrial wireless and satellite communication signals, and even partially available GPS signals.

As a preferred embodiment, the integration of temporal differential carrier (equivalent to a radial displacement measurement) with an inertial solution is similar, in principle, to that of displacement extracted from 2D scanning laser range profiles (line features) and video images (point features). As a result, additional sensors can be integrated.

A constant bias and scale factor are modeled in the error state vector for time offset and displacement sensor errors in the exemplary joint estimation formulation of this specification. It is possible to account for higher order effects by including such terms as drift in the error state.

The invention method can be extended to multiple users that cooperate with each other to form spatial differential measurements (code and carrier phase ranging). Such applications include cooperative simultaneous localization and mapping (CSLAM) and indoor geolocation.

The invention method also allows for seamless transition from GPS available, GPS-limited, to GPS denied environments and vice versa. When GPS is available, GPS solution can be used to calibrate not only the inertial sensors but also radio sources that are hearable.

It is understood that the various figures described above illustrated only the preferred embodiments of the present invention system and method. A person skilled in the art can therefore make numerous alterations and modifications to the described embodiments utilizing functionally equivalent components and method steps to those shown and described. All such modifications are intended to be included within the scope of the present invention as defined by the appended claims.

What is claimed is:

1. In an area that is overlapped by signals from a plurality of unsynchronized signal transmitters that are positioned at locations in said area, a method of calculating a position, velocity, and attitude for a moving object within said area, comprising the steps of:

providing at least one sensor within said moving object that produces linear displacement measurements and angular displacement measurements in response to motion;

starting from an initial position at an initial time, calculating a dead-reckoning navigation solution for said moving object by integrating said displacement measurements generated in a time period since said initial time;

providing at least one reference displacement receiver within said moving object that produces referenced displacement measurements from said signals of said unsynchronized signal transmitters, wherein said referenced displacement measurements include radial displacement measurements that are derived from parameters embodied by said signals, and wherein said parameters include carrier phase measurements;

calculating a corrected dead-reckoning navigation solution utilizing said referenced displacement measurements and said dead-reckoning navigation solutions, wherein said corrected dead-reckoning navigation solution includes values for position, velocity, and attitude, and predictions of radial displacement, wherein said step of calculating a corrected dead-reckoning navigation solution includes the substeps of;

generating errors between said carrier phase measurements and said radial displacement predictions;

applying an estimator to produce signal corrections to said dead-reckoning navigation solution;

obtaining temporal change of carrier phase measurements;

comparing a difference between said temporal change of carrier phase and said radial displacement predictions to predefined thresholds;

excluding said signal corrections from said estimator when said difference exceeds said predefined thresholds; and de-weighting said signal corrections when said difference stays within said predefined thresholds.

2. The method according to claim 1, wherein said at least one sensor is selected from a group consisting of accelerometers and gyroscopes.

3. The method according to claim 1, wherein said at least one referenced displacement receiver includes a radio receiver.

4. The method according to claim 3, wherein said parameters also include radio signal identification (ID), received signal strength indication (RSSI), and code phase measurements.

5. The method according to claim 1, wherein said referenced displacement measurements are obtained by:

selecting a frequency band for at least one of said signals;

down-converting said signals from said frequency band selected to a baseband signal;

acquiring and re-acquiring code phase and carrier frequency of said baseband signal; and applying a code tracking loop and a carrier tracking loop to said baseband signal, yielding said parameters.

6. The method according to claim 5, wherein said step of applying a code tracking loop and a carrier tracking loop, further includes the steps of;

preparing a plurality of code replicas around current code phase and a plurality of carrier replicas around current carrier phase and frequency;

applying close-in multipath mitigating discriminators to said baseband signal and said code and carrier replicas, yielding code and carrier errors;

filtering said code and carrier errors; and adjusting code and carrier numerical controlled oscillators according to said code and carrier errors after filtering to provide current code phase, carrier phase and frequency, therein closing said code and carrier tracking loops.

7. The method according to claim 1, wherein said unsynchronized signal transmitters are a combination of stationary and moving radio sources that are at known locations at time of signal transmission.

8. The method according to claim 1, wherein said unsynchronized signal transmitters includes a combination of terrestrial and space-based digital broadcast signals, wireless communication signals, radio navigation signals, and radio beacons.

9. The method according to claim 1, further including the step of calculating said initial position using a technique selected from a group comprising user setup, a coarse solution based on said received signal strength indication (RSSI), and a coarse solution based on said code phase measurements.

10. The method according to claim 1, wherein said step of calculating a corrected dead-reckoning navigation solution, further includes the steps of;

calculating a line of sight vector from said dead-reckoning navigation solution from at least one past position and said initial position to a plurality of radio sources at known locations;

obtaining said predictions of radial displacement to said radio sources from said at least one past position and said initial position;

wherein said estimator is applied to fuse said measurement errors using said line of sight vectors, thereby producing said corrections to said dead-reckoning navigation solution.

11. The method according to claim 10, wherein said plurality of radio sources at known locations are given in a radio source database.

12. The method according to claim 10, wherein said estimator includes a combination of navigation solution errors, sensor and clock bias and drift errors, and stationary and slow-moving multipath and NLOS signal errors.

13. The method according to claim 10, wherein said estimator is selected from a group comprising an extended Kalman filter, an unscented Kalman filter, and a particle filter.

14. The method according to claim 10, wherein from said at least one past location and current location to a plurality of radio signal measurements are made by a mobile user, thereby improving geometric dilution of precision.

15. The method according to claim 14, wherein said temporal change of carrier phase is compensated for a term that is caused by the change in said line of sight vector between said mobile user and said radio source.

16. The method according to claim 14, wherein said temporal change of carrier phase is further compensated for a term that is caused by the projection of the displacement vector of said mobile user onto said line of sight vector between said mobile user and said radio source.

17. The method according to claim 10, wherein said temporal change of carrier phase is obtained from carrier phase measurements that are tracked continuously over time intervals without loss of lock.

18. The method according to claim 17, wherein said carrier phase measurements are used without solving for an integer cycle ambiguity.

19. An apparatus for mutual-aiding and mutual-calibrating positioning and navigation, using inertial measurements and radio signals from transmitters at known locations, comprising:

an inertial measurement unit for obtaining linear displacement measurements and angular displacements;

a processor that calculates an initial navigation solution consisting of initial position, velocity, and attitude, wherein said processor utilizes integrating linear and angular displacement measurements from said initial navigation solution to obtain a dead-reckoning navigation solution;

a radio receiver for selecting a signal band of interest, down-converting said signal band to a baseband signal, acquiring and re-acquiring a code phase and carrier frequency and phase of said baseband signal, and maintaining code and carrier tracking loops to obtain radio signal ID, signal strength, code phase, and carrier phase measurements;

a mutual aiding and mutual calibrating integration processor for forming measurements of radial displacement to selected radio sources from temporal change of carrier phase measurements, wherein said processor detects, removes, and de-weights outlier and NLOS signals from radial displacement measurements, generates line of sight vectors to selected radio sources, obtains predicted radial displacement measurements, generates error measurements between predicted and measured radial displacement, adjusts the filter state to include navigation solution errors, sensor errors, and NLOS and multipath errors, and filters measurement errors to obtain estimates of navigation solution errors, sensor errors, and NLOS and multipath errors; and wherein said processor generates a corrected dead-reckoning navigation solution using navigation solution error estimates, to obtain corrected dead-reckoning navigation.

\* \* \* \* \*